(12) United States Patent
Miyamoto et al.

(10) Patent No.: US 12,510,040 B2
(45) Date of Patent: Dec. 30, 2025

(54) CONTROL DEVICE AND METHOD FOR CONTROLLING AN INJECTOR

(71) Applicant: Hitachi Astemo, Ltd., Hitachinaka (JP)

(72) Inventors: Akiyasu Miyamoto, London (GB); Naoki Yoneya, Tokyo (JP); Takao Miyake, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/858,504

(22) PCT Filed: Apr. 25, 2023

(86) PCT No.: PCT/JP2023/016296
§ 371 (c)(1),
(2) Date: Oct. 21, 2024

(87) PCT Pub. No.: WO2023/228666
PCT Pub. Date: Nov. 30, 2023

(65) Prior Publication Data
US 2025/0264071 A1    Aug. 21, 2025

(30) Foreign Application Priority Data
May 27, 2022 (DE) .................. 10 2022 205 308.7

(51) Int. Cl.
*F02D 41/30* (2006.01)
*F02M 51/06* (2006.01)

(52) U.S. Cl.
CPC ............. *F02D 41/30* (2013.01); *F02M 51/06* (2013.01)

(58) Field of Classification Search
CPC .......... F02D 41/30; F02D 41/40; F02D 41/08; F02D 41/247; F02D 2041/2055; F02D 2041/2003; F02D 2200/0602; F02M 51/06
See application file for complete search history.

(56) References Cited

U.S. PATENT DOCUMENTS

| | | | |
|---|---|---|---|
| 11,220,975 B1 * | 1/2022 | Pursifull | F02D 41/401 |
| 2016/0090936 A1 * | 3/2016 | Melis | F02D 41/402 |
| | | | 123/478 |

(Continued)

OTHER PUBLICATIONS

International Search Report (PCT/ISA/210) issued in PCT Application No. PCT/JP2023/016296 dated Jul. 25, 2023 (3 pages).

(Continued)

*Primary Examiner* — Grant Moubry
(74) *Attorney, Agent, or Firm* — Crowell & Moring LLP

(57) ABSTRACT

The herein described subject matter relates in particular to a control device (150) and a method for controlling a fuel injector (101) attached to an internal combustion engine to allow reducing the deviation of the fuel amount between different injectors/different injections in ballistic operation, the control device (150) comprising a control parameter calculation unit (603), an injection pulse calculation unit (604), an injection pulse compensation unit (605) and at least one memory (607 or 608). The control parameter calculation unit (603) is configured to determine a target closing time for the fuel injector (101) based on a fuel amount to be injected into the internal combustion engine. If the determined target closing time is larger than a maximum closing time of the fuel injector (101) in ballistic operation, the injection pulse calculation unit (604) is configured to calculate a pulse duration for the injector (101) based on a characteristic curve of the fuel injector (101), and to output the calculated pulse duration to the fuel injector (101) for injecting the fuel amount into the internal combustion engine. If the determined target closing time is equal to or smaller than the maximum closing time in the ballistic operation, the injection pulse compensation unit (605) is configured to receive a set of parameters from the at least one memory (607 or 608), to calculate a pulse duration for the fuel injector (101) based on the determined target closing (Continued)

time and the set of parameters; and to output the calculated pulse duration to the fuel injector (101) for injecting the fuel amount into the internal combustion engine.

25 Claims, 12 Drawing Sheets

(56) References Cited

U.S. PATENT DOCUMENTS

| | | | |
|---|---|---|---|
| 2016/0252035 A1* | 9/2016 | Katsurahara | F02D 41/2467 |
| | | | 123/478 |
| 2018/0149124 A1* | 5/2018 | Yanoto | F02D 41/247 |
| 2018/0209373 A1* | 7/2018 | Yoshiume | F02D 41/0255 |
| 2020/0088124 A1* | 3/2020 | Yanoto | F02D 41/40 |

OTHER PUBLICATIONS

Written Opinion (PCT/ISA/237) issued in PCT Application No. PCT/JP2023/016296 dated Jul. 25, 2023 (3 Pages).

* cited by examiner

CONTROL DEVICE AND METHOD FOR CONTROLLING AN INJECTOR

TECHNICAL FIELD

The present subject matter in particular relates to a control device and a method for controlling a fuel injector attached to an internal combustion engine, and to a method for adapting a pulse duration of a fuel injector and a learning unit for performing said method.

BACKGROUND ART

In order to comply with the current strict emission regulations, it is necessary to prevent fuel injected into a cylinder of an internal combustion engine from reaching the cylinder walls. To achieve this goal, dividing the amount of fuel to be injected into multiple small injections is a promising approach. However, for a precise metering of a small amount of fuel, the so-called ballistic operation range of the fuel injector must be exactly controlled.

CITATION LIST

Patent Literature

Patent Literature 1: US 2018/0209373 A1

SUMMARY OF INVENTION

Technical Problem

Patent Literature 1 describes a control device for controlling a fuel injection in an internal combustion engine, wherein a closing time of the fuel injector is determined based on the drive voltage thereof and a time period between a specified reference time and the closing time of the fuel injector is considered in a plurality of characteristic curves for each injection pulse width and each fuel injector in the internal combustion engine.

Solution to Problem

The herein described subject matter addresses the technical object of improving the accuracy of a small amount of fuel to be injected into an internal combustion engine with reduced calibration effort while maintaining the improved accuracy over the lifetime of the engine. This object is achieved by the subject matter of the appended claims.

According to the subject matter set forth in the appended claims, there is proposed a control device for controlling a fuel injector attached to an internal combustion engine. The control unit may preferably include an engine control unit (ECU) and a drive circuit for driving the fuel injector. The control device comprises a control parameter calculation unit, an injection pulse calculation unit, an injection pulse compensation unit and at least one memory. The at least one memory may be capable to store data permanently and/or non-permanently. It may be also possible that the at least one memory comprises a non-volatile memory and/or a volatile memory. Preferably, the at least one memory may comprise a read-only memory (ROM) and a random-access memory (RAM).

The fuel injector may preferably be a solenoid injector capable of injecting fuel directly into a combustion chamber of an internal combustion engine. The fuel injector may be electrically connected to the control device and may include a fuel supply unit disposed at an upper end of the fuel injector, a fuel injection port and a valve seat disposed at the lower end of the fuel injector, and a valve body disposed between the fuel supply and the valve seat.

Inside the fuel injector, a fuel passage may be provided so that fuel can flow from the fuel supply unit to the fuel injection hole. An injector coil may be arranged between a fixed iron core and a housing of the fuel injector. The fixed iron core, the injector coil and the housing may form an electromagnet.

In a valve closing state in which the injector coil is not energized, the valve body may be urged into the valve seat by a spring force of at least one spring that may bias the valve body in valve closing direction (towards the lower end of the fuel injector). For energizing the injector coil an injection pulse may be output from the control device which may cause a drive current/drive voltage to be applied to the injection coil.

When the injection coil is energized, the valve body may be separated from the valve seat and displaced in a valve opening direction (towards the upper end of the fuel injector). Accordingly, the fuel passage may be opened, and fuel may be injected through the fuel injection hole into the internal combustion engine.

A detail description of the parts and the functionality of a fuel injector that may be controlled according to the herein described subject matter can be found below in connection with FIG. 2.

The control parameter calculation unit of the control device determines a target closing time for the fuel injector based on a fuel amount to be injected into the internal combustion engine. The term "closing time for/of the fuel injector" shall be understood as a time period between a reference time and a time at which the fuel injector is completely closed, i.e., a time at which the valve body of the fuel injector is fully seated on its valve seat. The reference time may be, for example, a rising edge of an injection pulse signal output by the control unit for opening the fuel injector. It may be also possible to define the time at which the valve body is displaced from its seat as the reference time. Any other suitable time addressing the opening of the fuel injector may be selected as reference time as well. The closing time has been shown to correlate linearly with the amount of fuel injected, regardless of the operating range of the fuel injector.

The fuel amount to be injected may depend on operating conditions of the internal combustion engine such as engine load, engine speed, air-fuel ratio, fuel pressure etc., These operating conditions may be determined by a plurality of sensors that may be connected to the control device and may allow the control parameter calculation unit to determine the required fuel amount for a given operating condition.

If the determined target closing time is larger than a maximum closing time of the fuel injector in ballistic operation, the injection pulse calculation unit calculates a pulse duration for the injector based on a characteristic curve of the fuel injector, and outputs the calculated pulse duration to the fuel injector for injecting the fuel amount into the internal combustion engine.

A "pulse duration of/for the fuel injector" may be a duration/width of a control pulse (injection pulse) by which the amount of fuel to be injected can be controlled. A "ballistic operation of the fuel injector" shall be understood as an operation at which the injection pulse output to the fuel injector is stopped before the valve body of the fuel injector has achieved its full lift.

The maximum closing time of the fuel injector in ballistic operation may correlate with a pulse duration which causes the valve body to approach its full lift. This means that if the determined target closing time is larger than the maximum closing time of the injector in ballistic operation, the injector is operated at full lift of the valve body. In this case the pulse duration required to provide the fuel amount to be injected into the internal combustion engine is determined by the injection pulse calculation unit from a characteristic curve of the fuel injector. The characteristic curve may represent a relation between a pulse duration of the fuel injector and an associated fuel amount delivered by the injector. The characteristic curve may be provided for a particular type of fuel injector attached to the internal combustion engine and may be permanently stored in the at least one memory. However, the characteristic curve of the fuel injector only shows a defined linear relation between pulse duration and injected fuel amount when the fuel injector is operated at full lift of the valve body.

Therefore, if the determined target closing time is equal to or smaller than the maximum closing time in the ballistic operation, the injection pulse compensation unit receives a set of parameters from the at least one memory, and calculates a pulse duration for the fuel injector based on the determined target closing time and the received set of parameters.

According to a preferred example the set of parameters may include a slope and an intercept of a first correlation between pulse duration and closing time of the fuel injector. The set of parameters may be stored in the at least one memory.

In other words, if the fuel injector is operated in ballistic operation, the pulse duration for injecting the required fuel amount is calculated by the injection pulse compensation unit based on the determined target closing time, which is linearly related to the fuel amount to be injected, and a slope and an intercept of a first correlation representing a relation between a pulse duration and a closing time of the respective fuel injector. Subsequently, the injection pulse compensation unit outputs the calculated pulse duration to the fuel injector for injecting the fuel amount into the internal combustion engine.

By calculating the pulse duration in the above-described way, deviation of the injected fuel amount between different injectors and different injections of a single fuel injector in ballistic operation can be avoided without increasing the calibration effort.

According to an example, the control parameter calculation unit determines the target closing time for the fuel injector based on a second correlation between closing time and fuel amount of a plurality of fuel injectors. For example, the second correlation may be determined in advance on a test bench for all fuel injectors attached to the internal combustion engine and may be stored permanently in the at least one memory.

According to an example, the control unit may further comprise an injector closing time calculation unit and an injection pulse learning unit, wherein in a learning mode of the internal combustion engine, the injection pulse learning unit may stepwise increase the pulse duration of the fuel injector, and the injector closing time calculation unit may determine a closing time for each pulse duration, and may send the determined closing time back to the injection pulse learning unit. The injection pulse learning unit may in turn receive the determined closing time for each pulse duration from the injector closing time calculation unit, and may determine the first correlation between pulse duration and closing time of the fuel injector. The injector closing time calculation unit may be configured to perform mathematical operations on the driving signals (drive current, drive voltage) of the fuel injector such as filtering the signals and deriving the signals.

According to an example, the injection pulse learning unit may calculate a slope and an intercept of the first correlation between pulse duration and closing time of the fuel injector for each pulse duration, and may store the calculated slope and intercept in the at least one memory. Since the first correlation may not show a linear behaviour, the first correlation may preferably be approximated by calculating a slope and an intercept of the first correlation for subsequent pulse durations. Preferably, the calculated slope and intercept at each pulse duration may be non-permanently stored in the memory. This means that the learning procedure may be repeated regularly to constantly adapt the first correlation to the conditions of the fuel injector.

According to an example, the injection pulse learning unit may determine a closing time at which a calculated slope is equal to or smaller than a predetermined slope value as the maximum closing time of the fuel injector in ballistic operation, and may store the determined maximum closing time in the at least one memory. In other words, when a closing time is determined for a pulse duration at which a calculated slope a0 is equal to or smaller than a predetermined slope value, said closing time may be determined as the maximum closing time of the fuel injector in ballistic operation. Since the first correlation may show a significant decrease in the slope during the transition from ballistic operation to full stroke operation, the end of the ballistic operation range can be reliably determined by setting a predetermined slope value as a threshold value. This allows to limit the time required for the learning mode as well as the calculation effort of the control unit. For example, the predetermined slope value may be determined in advance on a test bench and may be stored permanently in the at least one memory.

According to an example, the injection pulse learning unit may stop the learning mode of the internal combustion engine when the maximum closing time of the fuel injector in ballistic operation is determined. In this way, only a limited number of relevant slopes and intercepts are calculated, so that the learning mode only takes a short time and does not affect the driving comfort.

According to an example, the injection pulse learning unit may start the learning mode when the internal combustion engine is operated in a predetermined operation mode.

For example, the learning mode may be started after each start of the combustion engine when the engine is idling. During this time, for example, the control unit can prevent the engine from taking up a load until the first correlation and its slopes and intercepts have been determined. This means that the first correlation is constantly adjusted during the operating time of the engine so that ageing effects of the fuel injector and environmental conditions that influence the opening/closing behaviour of the fuel injector can be permanently considered.

According to an example, the injector closing time calculation unit may determine the closing time of the fuel injector based on a drive voltage curve of the fuel injector. When the injection pulse is turned off to close the fuel injector, a reverse drive voltage may be applied to the injector coil and the current supply to the injector coil may be cut off. Due to the missing magnetic attraction force the valve body may be pushed back to the closed position where it may be urged on the valve seat by the load of at least one spring.

At a time, the valve body impinges on the valve seat, a slope of the drive voltage may change resulting in an inflection point. This inflection point can be used to determine the time at which the closing of the valve is completed. For example, by forming the second derivative of the control voltage curve, the inflection point can be determined exactly as a maximum or minimum value.

The herein disclosed subject matter further includes an internal combustion engine including at least one fuel injector and the control device as described above.

Further there is claimed a method for controlling a fuel injector attached to an internal combustion engine. Each configuration of the claimed control device shall also be encompassed by way of a method, which may be claimed by itself and/or by way of a computer program product claim.

Additionally, there is claimed a method for adapting a pulse duration of a fuel injector attached to an internal combustion engine by an injection pulse learning unit in a learning mode of the internal combustion engine. The method comprises the steps of stepwise increasing a pulse duration of the fuel injector, detecting a closing time for each pulse duration, calculating a slope and an intercept between pulse duration and closing time of the fuel injector for each pulse duration, determining a closing time at which a calculated slope is equal to or smaller than a predetermined slope value and/or a closing time at which a calculated slope has a negative slope value as a maximum closing time of the fuel injector in ballistic operation, stopping the learning mode after determining the maximum closing time of the fuel injector in ballistic operation, and storing the calculated slopes and intercepts and the maximum closing time of the fuel injector in ballistic operation as a set of parameters in at least one memory.

The method for adapting a pulse duration of a fuel injector shall be carried out by a computer program product storable in a memory, and/or by an injection pulse learning unit for a control device.

Advantageous Effects of Invention

Summarizing, the disclosed subject matter allows for significantly reducing the deviation of the fuel amount between different injectors/different injections in ballistic operation. This can be achieved by calculating a pulse duration of an individual fuel injector based on a general linear relationship between closing time and injected fuel amount Q (second correlation), which can be adapted to the individual behaviour of a respective fuel injector via a first correlation between pulse duration and closing time for each fuel injector. The described calculation requires very little calibration effort and ensures a continuous adjustment of the calculated pulse duration during the operating time of the engine so that ageing effects of the fuel injectors and environmental conditions that influence the opening/closing behaviour of the fuel injectors can be permanently considered.

BRIEF DESCRIPTION OF DRAWINGS

In the following the claimed subject matter will be further explained based on at least one preferential example with reference to the attached drawings, wherein:

DESCRIPTION OF EMBODIMENTS

Figure 1:
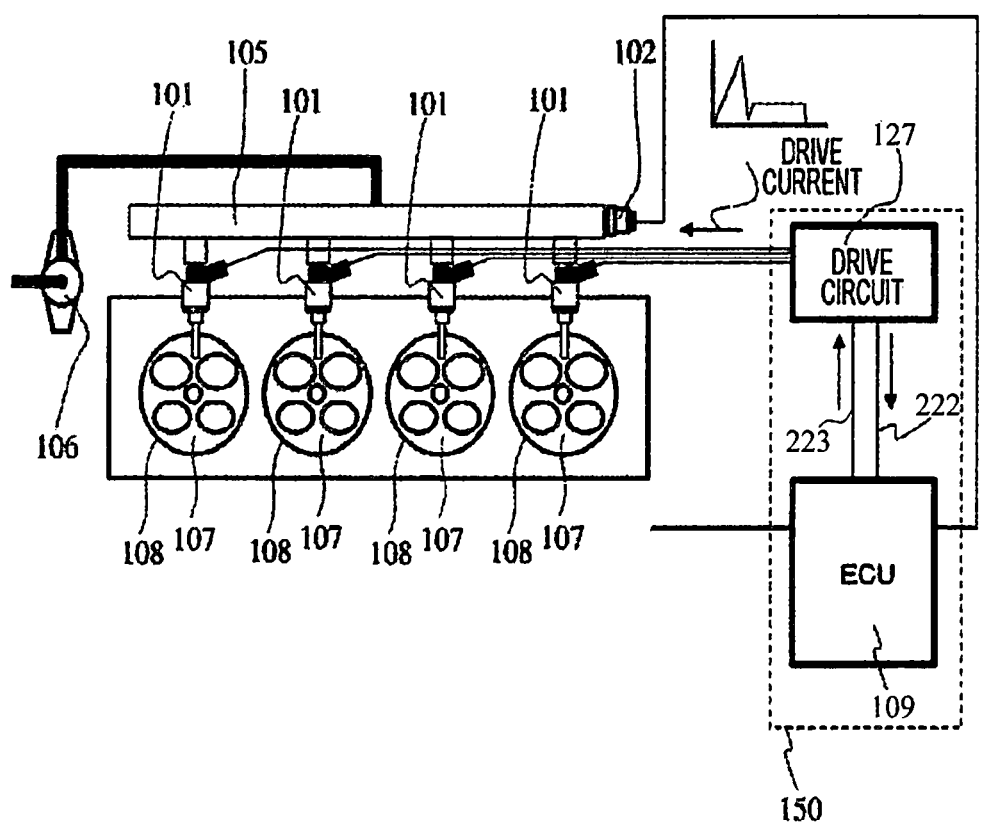
FIG. 1 shows schematically an example of a fuel injection system of an internal combustion engine.

FIG. 1 shows schematically an example of a fuel injection system for an internal combustion engine comprising a fuel pump 106, a fuel rail 105 with a pressure sensor 102, four fuel injectors 101 and a control device 150. The number of fuel injectors is not restricted to four but may be, e.g., in a range of 1 to 12.

In the depicted example, one fuel injector 101 is installed in each cylinder 108 of an internal combustion engine (not depicted) to directly inject fuel into a combustion chamber 107 of the cylinder 108. It may be also possible that more than one injector is installed in each cylinder. The fuel to be injected may be pressurized by a fuel pump 106 and delivered via a fuel pipe 105 to the fuel injector 101. The fuel pressure may vary according to a balance between a flow amount of the fuel discharged by the fuel pump 106 and an injection amount of the fuel injected into the combustion chamber 107 by the fuel injector 101. However, the discharge amount of the fuel from the fuel pump 106 may be controlled by the control device 150 such that the pressure in the fuel pipe 105 becomes a predetermined pressure on the basis of the information of the pressure sensor 102.

The fuel injection of each fuel injector 101 may be controlled by a width of an injection pulse (pulse duration) sent from an engine control unit (ECU) 109 to a drive circuit 127. The drive circuit 127 may calculate a drive current curve based on the injection pulse received from the ECU 109. The calculated drive current curve may then be supplied to each fuel injector 101. The drive circuit 127 may be an integral part of the ECU 109 or a separate device. The drive circuit 127 and the ECU 109 may be included in the control device 150.

Figure 2:
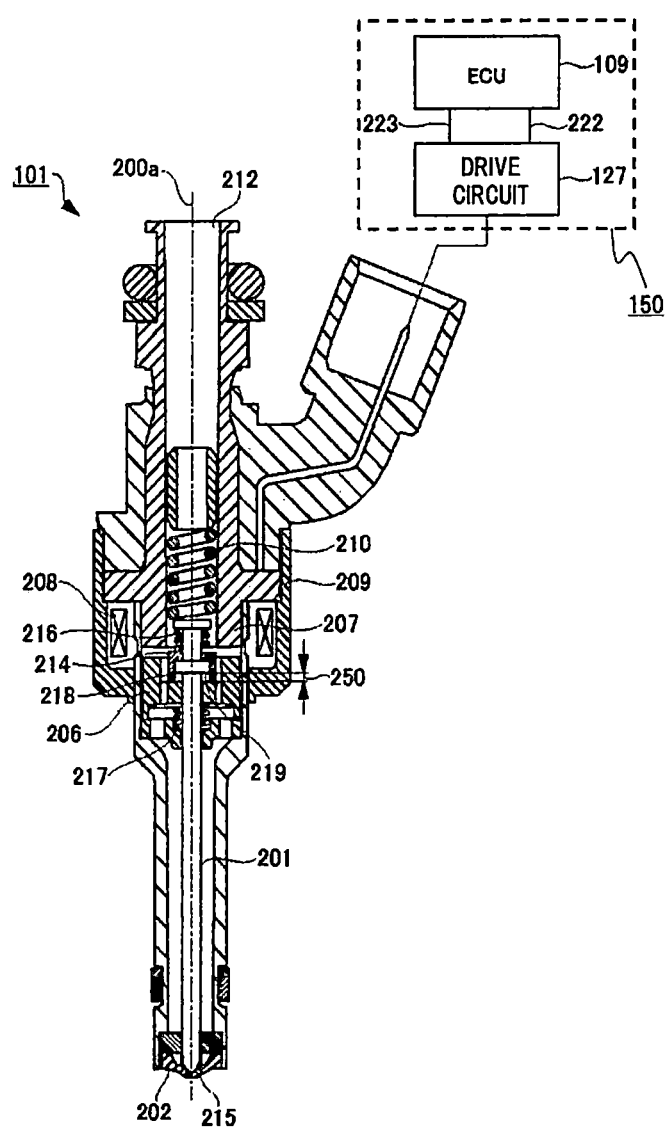
FIG. 2 shows a cross-sectional view of an exemplary fuel injector connected to a control device including a drive circuit and an engine control unit (ECU)

FIG. 2 shows a cross-sectional view of an exemplary fuel injector connected to the control device 150 already shown in FIG. 1, the control device 150 including the drive circuit 127 and the ECU 109.

The illustrated fuel injector 101 includes a fuel supply unit 212 disposed at an upper end of the fuel injector 101, a fuel injection hole 215 and a valve seat 202 disposed at the lower end of the fuel injector 101, and a valve body 201 with an intermediate member 214 and a movable iron core 206 disposed between the fuel supply 212 and the valve seat 202.

Inside the fuel injector 101, a fuel passage is provided so that fuel can flow along a central axis 200a of the fuel injector 101 from the fuel supply unit 212 to the fuel injection hole 215. An injector coil 208 is arranged between a fixed iron core (stator) 207 and a housing 209 of the fuel injector 101. The fixed iron core 207, the injector coil 208 and the housing 209 form an electromagnet.

In a valve closing state in which the injector coil 208 is not energized, the valve body 201 is urged into the valve seat 202 by spring forces of a first spring 210 and a second spring 216 that biases the valve body 201 in valve closing direction (towards the lower end of the fuel injector 101). The spring forces of the first and second springs 210, 216 act against a spring force of a third spring 217 that biases the movable iron core 206 in valve opening direction (towards the upper end of the fuel injector 101) so that it abuts on the intermediate member 214. Since the spring force of the second spring 216 is larger than the spring force of the third spring 217, a gap 250 is formed between the valve body 201 and the movable iron core 206.

The drive circuit 127 and the ECU 109 are connected to the fuel injector 101. The ECU 109 may receive a plurality of sensor signals indicating operating conditions of the internal combustion engine (not depicted) from various types of sensors such as the pressure sensor 102 attached to the fuel pipe on the upstream side of the fuel injector 101 (see FIG. 1), and may calculate a required fuel amount Q according to the operating conditions of the internal combustion engine based on which a pulse duration and an injection timing of the fuel injector 101 may be calculated. The injection pulse output from the ECU 109 may be input to the drive circuit 127 through a signal line 223.

The drive circuit 127 may have a circuit receiving the injection pulse from the ECU 109 and energizing the injector coil 208 of the fuel injector 101 with a drive current/drive voltage for performing a fuel injection. The ECU 109 may communicate with/receive information from the drive circuit 127 via a communication line 222, and may switch the drive current generated by the drive circuit 127 according to the fuel pressure and the operating conditions of the internal combustion engine.

When the injection coil 208 is energized, a magnetic driving force may be generated by the electromagnet comprising the solid iron core 207, the coil 208, and the housing 209. Due to this magnetic driving force, a magnetic flux may circulate in a magnetic path passing through the coil 208 the fixed iron core 207, the movable iron core 206, the housing 209, and the movable iron core 206. Thus, a magnetic attractive force acts between the movable iron core 206 and the fixed iron core 207, and the movable iron core 206 and the intermediate member 214 are displaced toward the fixed iron core 207.

The movable iron core 206 may be displaced until a transmission surface 219 of the valve body 201 and a transmission surface 218 of the movable iron core 206 abut. During this time, the valve body 201 may still be in contact with the valve seat 202. Only when the movable iron core 206 is displaced by the gap 250 generated between the valve body 201 and the movable iron core 206 so that the transmission surface 219 of the valve body 201 and the transmission surface 218 of the movable iron core 206 collide, the valve body 201 may be separated from the valve seat 202 by the kinetic energy of the movable iron core 206. Accordingly, the fuel passage may be opened, and fuel may be injected through the fuel injection hole 215 into the internal combustion engine.

Once the movable iron core 206 abuts against the fixed iron core 207 during its displacement, the valve body 201 may be displaced in the valve opening direction, and the movable iron core 206 may be displaced in a valve closing direction. This means that when the fixed iron core 207 and the movable iron core 206 collide, the valve body 201 and the movable iron core 206 may be separated from each other, and the movable iron core 206 may be displaced to the valve closing direction and may become stationary at a target lift position (stable valve opening state).

Subsequently, when the power supply to the injection coil 208 is turned off and the magnetic attraction force is removed, the movable iron core 206 may be pushed back by the spring force of the first spring 210 and the force caused by the fuel pressure to a closed position where the valve body 201 is urged into the valve seat 202. The spring force of the first spring 210 acting on the valve body 201 may be transmitted to the movable iron core 206 via the transmission surface 219 on the valve body 201 and the transmission surface 218 on the movable iron core 206.

After a required valve closing time the valve body 201 may impinge on the valve seat 202 and the transmission surface 218 on the movable iron core 206 may be separated from the transmission surface 219 on the valve body 201.

When closing the fuel injector 101, the third spring 217 may shift from extension to compression and once the valve body 201 collides with the valve seat 202, a movement direction of the movable iron core 206 may be reversed. This may change the acceleration of the movable iron core 206 and thus the inductance of the injector core 208. This effect can be used to detect the closing time of the fuel injector as described below in connection with the FIGS. 3a to 3d.

FIGS. 3a to 3d show schematically an injection pulse ti to operate the fuel injector 101 depicted in FIG. 2 in a fully open state (FIG. 3a), an associated drive voltage 304, 305

Figure 3A:
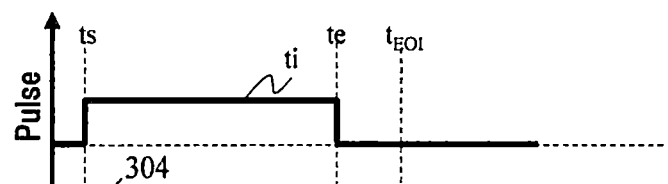
FIG. 3a shows schematically an injection pulse to operate the fuel injector depicted in FIG. 2 in a fully open state.
Figure 3B:
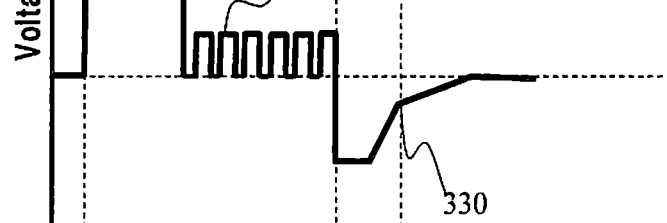
FIG. 3b shows schematically an associated drive voltage supplied to the fuel injector.
Figure 3C:
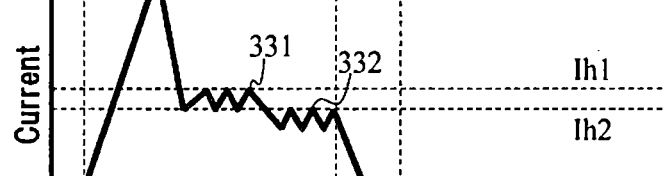
FIG. 3c shows schematically an associated drive current supplied to the fuel injector.
Figure 3D:
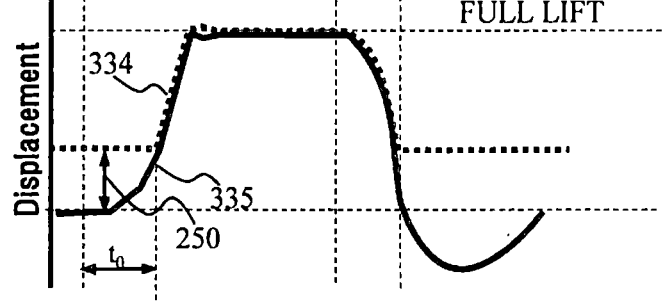
FIG. 3d shows schematically a resulting valve displacement amount.

(FIG. 3b) and an associated drive current 308, 331, 332 (FIG. 3c) supplied to the fuel injector 101, and resulting displacement curves of the valve body 201 (dotted displacement curve 334 in FIG. 3d) and the movable iron core 206 (solid displacement curve 335 in FIG. 3d).

In the FIGS. 3a to 3c, it can be seen that when an injection pulse ti is sent to the fuel injector 101 at a time ts, a high voltage 304 is applied to it and the power supply to the injection coil 208 is started. A high voltage may be a voltage with a value of 50 V or more. As a result, the movable iron core 206 is displaced in the valve opening direction (see solid displacement curve 335 in FIG. 3d). The movable iron core 206 passes the gap 250 in the delay time $t_0$ and then abuts the valve body 201. Subsequently, both elements are displaced until a full lift of the valve body 201 is reached (see displacement curves 334, 335 in FIG. 3d).

After a current value, as indicated by the current curve 308, has risen steeply due to the application of the high voltage 304 and has reached a predetermined peak current value Ip, to achieve a fully open state of the fuel injector 101, the application of the high voltage 304 is stopped/reduced at a time t31 so that the current value is lowered to a first holding current value Ih1 according to a first current profile 331. Then, a pulse-width modulated low voltage 305 is applied to the fuel injector 101 to obtain the first hold current value Ih1. A low voltage may be a battery voltage with a value in the range of 12 V to 14 V. In a next step the current is lowered to a second holding current value Ih2 according to a second current profile 332 by reducing the pulse-width of the low voltage 305 (see FIGS. 3b and 3c). By applying the holding current Ih1 and Ih2 to the fuel injector 101 a stable valve opening state can be maintained.

Subsequently, when the injection pulse ti is turned off at the time te, the drive circuit 127 applies a reverse drive voltage to the injector coil 208 (see FIG. 3b). As a result, the current supply to the injector coil 208 is cut off (see FIG. 3c), the magnetic flux generated in the magnetic circuit is removed, and thus the magnetic attraction force is also removed. Consequently, the movable iron core 206 that has lost the magnetic attraction force may be pushed back to the closed position where the valve body 201 may impinge on the valve seat 202 by the load of the first spring 210 and the force due to the fuel pressure (see FIG. 3d).

At a time $t_{EOI}$ the closing of the valve 201, 202 is completed and the valve body 201 is fully seated on the valve seat 202 again. When the valve body 201 impinges on the valve seat 202, the transmission surface 218 on the movable iron core 206 separates from the transmission surface 219 on the valve body 201 and continues to move in the valve closing direction. At this time, a slope of the drive voltage changes resulting in an inflection point 330 (see FIG. 3b). This inflection point 330 can be used to determine the time $t_{EOI}$ at which the closing of the valve 201, 202 is completed.

In other words, when the fuel injector 101 is closed, the drive current flowing through the injector coil 208 is cut off, and a counter electromotive force is applied to the injector coil 208. After the drive current is completely dissipated, the counter electromotive force gradually decreases, and by changing the inductance when the valve body 201 collides with the valve seat 202 an inflection point 330 is generated in the drive voltage (see FIGS. 3b to 3d). For example, by deriving the drive voltage curve applied to the fuel injector twice, the inflection point 330 can be determined exactly as a maximum or minimum value.

Figure 4A:
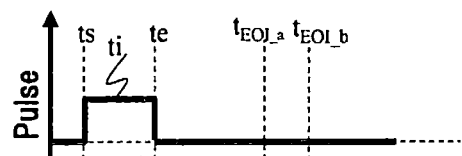
FIG. 4a shows schematically an injection pulse to operate the fuel injector depicted in FIG. 2 in a ballistic state.
Figure 4B:
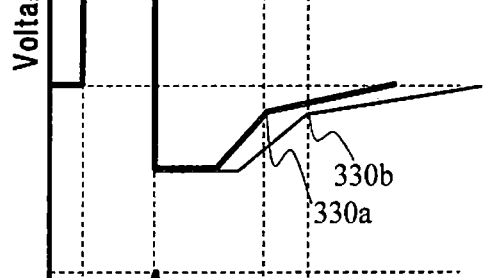
FIG. 4b shows schematically an associated drive voltage supplied to the fuel injector.
Figure 4C:
FIG. 4c shows schematically an associated drive current supplied to the fuel injector.
Figure 4D:
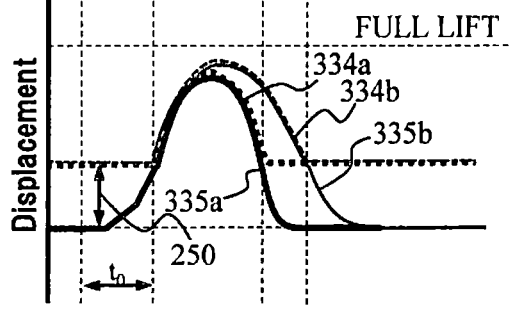
FIG. 4d shows schematically a resulting valve displacement amount.

FIGS. 4a to 4d show schematically an injection pulse ti, to operate the fuel injector depicted in FIG. 2 in a ballistic state (FIG. 4a), an associated drive voltage 304 (FIG. 4b) and an associated drive current 308 (FIG. 4c) supplied to the fuel injector 101, and resulting displacement curves of the valve body 201 (dotted displacement curves 334a, b in FIG. 4d) and the movable iron core 206 (solid displacement curve 335a, b in FIG. 4d).

As in FIGS. 3a to 3d, an injection pulse ti is also sent to the fuel injector 101 at a time ts, a high voltage 304 is applied and thus the power supply to the injection coil 208 is started, resulting in a displacement of the movable iron core 206 in the valve opening direction (see solid displacement curve 335 in FIG. 3d). Similar to FIG. 3d, the movable iron core 206 passes the gap 250 in the delay time to and abuts the valve body 201 so that both elements are displaced.

Different to the fuel injector operation shown in the FIGS. 3a to 3d, the injection pulse ti is turned off at a time the shortly after the current curve 308 has reached the predetermined peak current value Ip and a reverse voltage is applied to the fuel injector 101 (see FIGS. 4b and 4c). As a result, the valve body 201 does not achieve its full lift but is pushed back to the closed position at about two thirds of the lift (see dotted displacement curves 334a, b in FIG. 4d).

It becomes clear from FIG. 4d that stopping the injection pulse before the valve body has achieved its full lift (ballistic operation/ballistic state of the fuel injector) may lead to a different displacement of the iron core 206 (see displacement curves 335a, b in FIG. 4d) and the valve body 201 (see displacement curves 335a, b in FIG. 4d) and thus to a variation in the closing time $t_{EOI\_a}$, $t_{EOI\_b}$ of the valve 201, 202. This means that when operating the fuel injector in ballistic operation a stable valve opening state cannot be achieved so that a high deviation of the injected fuel amount may occur without additional measures.

To solve the above-mentioned problem, the closing time $t_{EOI}$ of the valve 201, 202 can be determined using the inflection point 330a, b derived from the drive voltage (see FIG. 4b). Due to the defined correlation between closing time $t_{EOI}$ and injected fuel amount, it is possible to compensate for the fuel deviation in ballistic operation by individually adjusting the injection pulse ti of each fuel injector 101. Preferred examples of the implementation of such compensation according to the subject matter disclosed herein are described below in connection with FIGS. 6 to 12.

Figure 5:
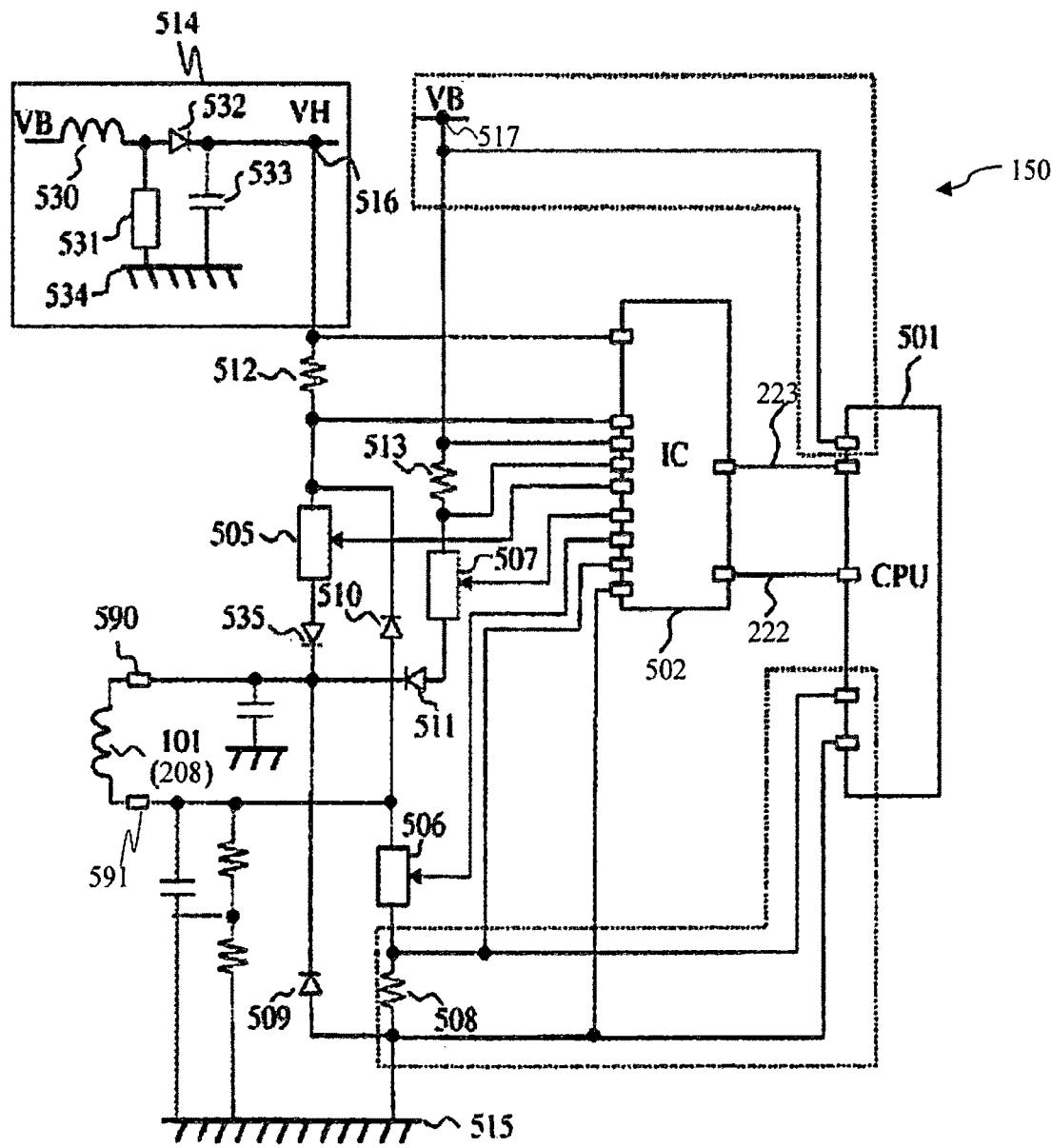
FIG. 5 shows schematically an example of a hardware configuration of the control device depicted in the FIGS. 1 and 2.

FIG. 5 shows schematically an example of a hardware configuration of the control device 150 depicted in the FIGS. 1 and 2. In the depicted example, the hardware configuration comprises a CPU 501, which is connected to a drive IC 502 via the communication line 222 and the signal line 223. The CPU may be included in the ECU 109 and the drive IC 502 may be included in the drive circuit 127, for example.

Furthermore, the depicted hardware configuration comprises a boosting circuit 514 for providing a high voltage VH at a high voltage source 560, the high voltage VH generated by boosting a battery voltage VB input to the boosting circuit 514. The boosting circuit 514 may be a DC/DC converter. In the depicted example, the boosting circuit 514 includes a coil 530, a transistor 531, a diode 532 and a capacitor 533. The transistor 531 is connected via the drive IC 502 to the CPU 501, and the boosting voltage VH output from the boosting circuit 514 can be detected by the drive IC 502 or the CPU 501.

Furthermore, according to the depicted example, a switching element 505 is disposed between the high voltage source 516 of the boosting circuit 514 and a terminal 590 on a high voltage side of the fuel injector 101. In addition, a switching element 507 is arranged between a low voltage source 517 and the terminal 590 on the high voltage side of the fuel injector 101, and a further switching element 506 is disposed between a terminal 591 on the low voltage side of the fuel injector 101 and the ground potential 515. The switching elements 505, 506, and 507 may be transistors, preferably field-effect transistors (FET) capable of switching the fuel injector 101 ON and OFF.

In the depicted example, a diode 535 is arranged between the terminal 590 on the high voltage side of the injector coil 208 and the switching element 505, to cause the current flowing from the high-voltage source 516 toward the injector coil 208 and the ground potential 515. Further, a diode 511 is disposed between the terminal 590 on the high voltage side of the coil 208 and the switching element 507, to cause the current flowing from the low voltage source 517 toward the injector coil 208 and the ground potential 515. The low voltage source 517 may be a battery supplying a voltage VB, which may be in the range of 12 to 14 V, for example.

Additionally, a diode 509 and a diode 510 are provided in the depicted hardware configuration, in order to apply a reverse drive voltage to the injector coil 208. In addition, current detection resistors 508, 512, and 513 are connected to the drive IC 502, to detect a current value flowing from the respective source to the fuel injector 101.

The CPU 501 may receive a plurality of sensor signals indicating operating conditions of the internal combustion engine (not depicted) from various types of sensors such as the pressure sensor 102 attached to the fuel pipe on the upstream side of the fuel injector 101 (see FIG. 1), and may calculate a required fuel amount Q according to the operating conditions of the internal combustion engine based on which a pulse duration and an injection timing of the fuel injector 101 may be calculated.

Subsequently, the CPU 501 may output the calculated pulse duration at the respective timing to the drive IC 502 of the fuel injector 101 via the signal line 223. Based on the detected current value, the drive IC 502 may switch the switching elements 505, 506, and 507, in order to generate a desired drive current. In other words, the switching elements 505, 506, and 507 may be switched between energizing and de-energizing by the drive IC 502, to supply the drive current to the fuel injector 101.

Figure 6:
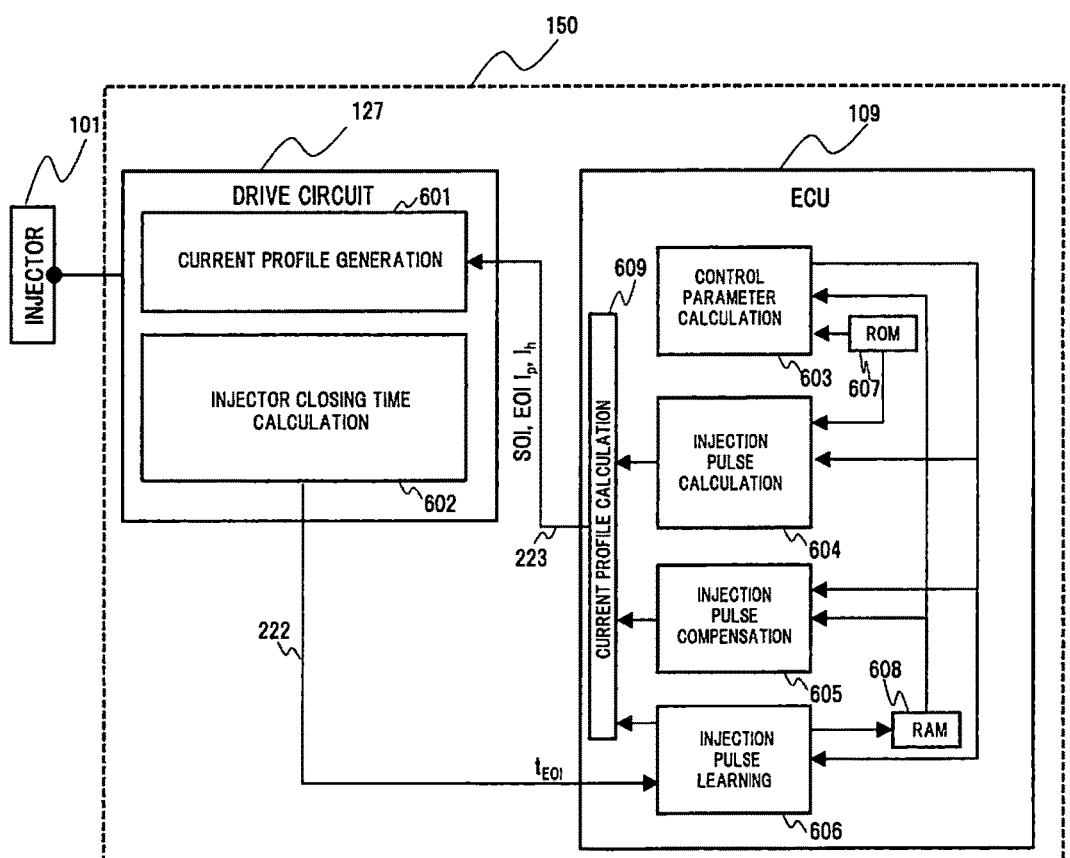
FIG. 6 shows schematically a functional configuration of the control device depicted in the FIGS. 1 and 2 according to a preferred example of the herein disclosed subject matter.

FIG. 6 shows schematically a functional configuration of the control device 150 depicted in the FIGS. 1 and 2 according to a preferred example of the herein disclosed subject matter. As already shown in the FIGS. 1 and 2, the control device 150 is connected to the injector 101 and comprises the ECU 109 and the drive circuit 127. According to a preferred example of the herein disclosed subject matter the ECU 109 includes a control parameter calculation unit 603, an injection pulse calculation unit 604, an injection pulse compensation unit 605, an injection pulse learning unit and a current profile calculation unit 609. Additionally, a read-only memory (ROM) 607 and a random-access memory (RAM) 608 are included in the ECU 109. The drive circuit 127 of the control device 150 comprises a current profile generation unit 601 and an injector closing time calculation unit 602.

The control parameter calculation unit 603 determines a target closing time $t_{EOI\_tar}$ for the fuel injector 101 based on a fuel amount $Q_{tar}$ to be injected into the internal combustion engine (not depicted). The fuel amount $Q_{tar}$ may depend on the operating conditions of the internal combustion engine such as engine load, engine speed, air-fuel ratio etc., These operating conditions may be determined by a plurality of sensors (not depicted) that may be connected to the ECU 109 and allow the latter to determine the required fuel amount $Q_{tar}$ for a given operating condition.

The control parameter calculation unit 603 may determine the target closing time $t_{EOI\_tar}$ corresponding to the fuel amount $Q_{tar}$ to be injected based on a predetermined correlation between closing time $t_{EOI}$ and fuel amount Q of a plurality of fuel injectors 101. For example, this predetermined correlation (second correlation) may be determined in advance on a test bench for all fuel injectors 101 attached to the internal combustion engine and stored in the ROM 607 of the ECU 109.

The control parameter calculation unit 603 further determines whether the determined target closing time $t_{EOI\_tar}$ is larger than a maximum closing time $t_{EOI\_max}$ of the fuel injector 101 in ballistic operation. If this is the case, the control parameter calculation unit 603 may cause the injection pulse calculation 604 unit to calculate a pulse duration ti for the fuel injector 101 based on a characteristic curve thereof.

Figures 7A, 7B:
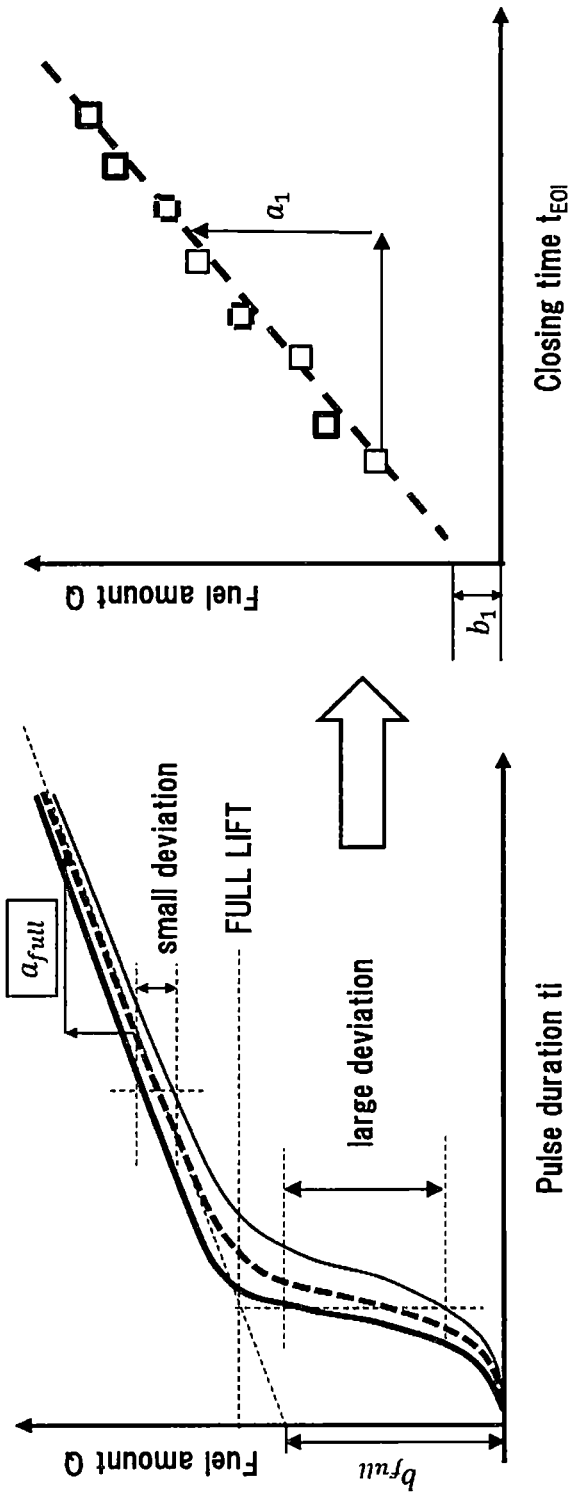
FIG. 7a shows schematically a relation between pulse duration and injection amount of different fuel injectors not controlled according to the herein disclosed subject matter.
FIG. 7b shows schematically a relation between the closing time and the injection amount of said fuel injectors.

The characteristic curve of the fuel injector may represent a relation between a pulse duration ti of the fuel injector 101 and an associated fuel amount Q delivered by the injector 101 (see FIG. 7a). The characteristic curve may be provided for the particular type of fuel injector 101 attached to the internal combustion engine and may be stored in the ROM 607 of the ECU 109. The injection pulse calculation unit 604 may output the calculated pulse duration ti to the current profile calculation unit 609, which may calculate a current profile (start of injection SOI, end of injection EOI, peak current Ip, holding current Ih etc.) based on the calculated pulse duration ti and send the calculated current profile to the current profile generation unit 601 of the drive circuit 127 via the signal line 223. The current profile generation unit 601 may generate the required drive current/drive voltage and supply it to the injector 101 for injecting the required fuel amount $Q_{tar}$ into the internal combustion engine.

If the control parameter calculation unit 603 determines that the determined target closing time $t_{EOI\_tar}$ is equal to or smaller than a maximum closing time $t_{EOI\_max}$ of the fuel injector 101 in ballistic operation, it may cause the injection pulse compensation unit 605 to receive a slope $a_0$ and an intercept $b_0$ of a first correlation between pulse duration ti and closing time $t_{EOI}$ of the fuel injector 101 from the RAM 608 to calculate a pulse duration ti for the fuel injector 101 based on the determined target closing time $t_{EOI\_tar}$ and the received slope $a_0$ and intercept $b_0$.

This means that for each injector 101 an individual pulse duration ti is calculated by the injection pulse compensation unit 605 based on the target closing time $t_{EOI\_tar}$, which is adapted by a first correlation between pulse duration ti and closing time $t_{EOI}$ of each fuel injector 101. The target closing time $t_{EOI\_tar}$ as a function of the fuel amount $Q_{tar}$ to be injected may be the same for each fuel injector 101, while the first correlation between pulse duration ti and closing time $t_{EOI}$ may be determined individually for each fuel injector 101 by the injection pulse learning unit 606 and stored in the RAM 608. After the injection pulse compensation unit 605 has calculated the individual pulse duration ti for each fuel injector 101 it may output each pulse duration ti to the current profile calculation unit 609, which may calculate a current profile for each fuel injector 101 based on the calculated pulse durations ti and send it to the current profile generation unit 601 of the drive circuit 127 via the signal line 223.

The injection pulse learning unit 605 may determine the first correlation between pulse duration ti and closing time $t_{EOI}$ of the fuel injector 101 in a learning mode of the internal combustion engine. During the learning mode the injection pulse learning unit 605 may stepwise increase the pulse duration ti of a fuel injector 101 of the internal combustion engine and send each pulse duration ti to the injector closing time calculation unit 602 of the drive circuit 127, which may determine and send back to the injector pulse learning unit 605 a closing time $t_{EOI}$ for each of the received pulse durations ti via the communication line 222.

The injector closing time calculation unit 602 of the drive circuit 127 may determine the closing time $t_{EOI}$ of a fuel injector 101 based on a drive current curve thereof. As described above in connection with the FIGS. 3b and 4b, the slope of the drive voltage changes, when the valve body 201 impinges on the valve seat 202 resulting in an inflection point 330 of the drive voltage (see FIGS. 3b and 4b). This inflection point 330, 330a, b can be used to determine the closing time $t_{EOI}$ of the respective fuel injector 101, for example by forming the second derivative of the control voltage curve.

Based on the closing time $t_{EOI}$ received from the injector closing time calculation unit 602, the injection pulse learning unit 606 may determine the first correlation between pulse duration ti and closing time $t_{EOI}$ of the respective fuel injector 101 and store it into the RAM 608. Additionally, the injection pulse learning unit 605 may calculate a slope $a_0$ and an intercept $b_0$ of the first correlation between pulse duration ti and closing time $t_{EOI}$ of the respective fuel injector 101 for each pulse duration ti, and store the calculated slopes $a_0$ and intercepts $b_0$ also into the RAM 608.

Calculating a slope $a_0$ and an intercept $b_0$ for each pulse duration may mean that a slope $a_0$ of the closing time and the corresponding intercept $b_0$ between two adjacent pulse durations ti are determined. The slope $a_0$ and intercept $b_0$ for the first pulse duration ti1 sent to the injector closing time calculation unit 602 can be determined, for example, by using the delay time $t_0$ of the fuel injector 101 having a value of $t_{EOI}=0$ as the preceding pulse duration ti0 for the first pulse duration ti1.

If the injection pulse learning unit 606 calculates a closing time $t_{EOI}$ at which a calculated slope $a_0$ is smaller than a predetermined slope value $a_{0\_thr}$ while stepwise increasing the pulse duration ti in the learning mode, it may determine said closing time t FOI as the maximum closing time $t_{EOI\_max}$ of the fuel injector 101 in ballistic operation and store the determined maximum closing time $t_{EOI\_max}$ in the RAM 608. This procedure may be repeated for all fuel injectors 101 installed in the internal combustion engine.

The injection pulse learning unit 606 may stop the learning mode of the internal combustion engine when the maximum closing time $t_{EOI\_max}$ of each fuel injector in ballistic operation is determined and stored in the RAM. The learning mode may be started by the injection pulse learning unit 606 when the internal combustion engine is operated in a predetermined operation mode. In this case, the injection pulse learning unit 606 may be caused by the control parameter calculation unit 603 to stepwise increase the pulse duration ti of a first fuel injector 101 for determining the closing time $t_{EOI}$ for each step and calculating the respective slopes $a_0$ and intercepts $b_0$ of the first correlation.

The learning mode may be started, for example, after each start of the combustion engine when the engine is idling. During this time, for example, the ECU 109 can prevent the engine from taking up a load until the first correlation and its slopes $a_0$ and intercepts $b_0$ have been determined for all fuel injectors 101. This means that the first correlation is constantly adjusted during the operating time of the engine so that ageing effects of the fuel injectors 101 and environmental conditions that influence the opening/closing behaviour of the fuel injectors 101 can be permanently considered.

Since the learning mode is terminated when the maximum closing time in ballistic operation $t_{EOI\_max}$ of each fuel injector 101 is reached, the learning mode may last only a short time and does not influence the driving comfort.

FIG. 7a shows schematically a relation between pulse duration ti and injection amount Q of different fuel injectors 101 not controlled according to the herein disclosed subject matter. The relation shown as a dashed line may be a typical curve of the type of fuel injector shown and may be stored as a characteristic curve in the ECU 109. It becomes clear from FIG. 7a that the same pulse duration ti can result in different fuel quantities Q for different injectors 101 when the fuel injectors 101 are operated in the ballistic state, i.e., the injection pulse ti is terminated before the valve body 201 has reached its full lift. In other words, if the characteristic curve of the fuel injector 101 is used for metering the fuel amount Q in ballistic operation, a large deviation of the injected fuel amount Q is to be expected. Even with a single injector 101 operated in ballistic operation, large deviations in the injected fuel amount Q can occur between different injections with the same pulse duration ti.

Therefore, according to the subject matter disclosed herein, the characteristic curve of a fuel injector 101 is only used for metering the fuel amount Q to be injected when the closing time $t_{EOI}$ of a fuel injector 101 is larger than the maximum closing time $t_{EOI\_max}$ of the fuel injector 101 in ballistic operation. In other words, the characteristic curve of a fuel injector 101 is used only when the fuel injector 101 is operated in a stable valve opening state/fully open state in which the valve body 201 reaches its full lift. FIG. 7a shows that in this case the characteristic curve has a linear behaviour over the pulse duration ti with a slope $a_{full}$ and an intercept $b_{full}$ and that only a small deviation of the injected fuel amount Q between different fuel injectors/different injections is to be expected.

FIG. 7b shows schematically a relation between the closing time $t_{EOI}$ and the injection amount Q of the same fuel injectors 101 as shown in FIG. 7. FIG. 7b illustrates that there is a linear relationship between the closing time $t_{EOI}$ of the different injectors 101 and the fuel amount Q. This relationship is valid for the entire operating range of the fuel injectors 101, i.e., for ballistic operation as well as for operation at full lift of the valve body 201. Thus, a target closing time $t_{EOI\_tar}$ can be determined using the slope $a_1$ and intercept $b_1$ of a single correlation (second correlation) valid for all fuel injectors 101 installed in the internal combustion engine, which may be determined once and may be stored in the ROM 607 of the ECU 109.

Figure 8A:
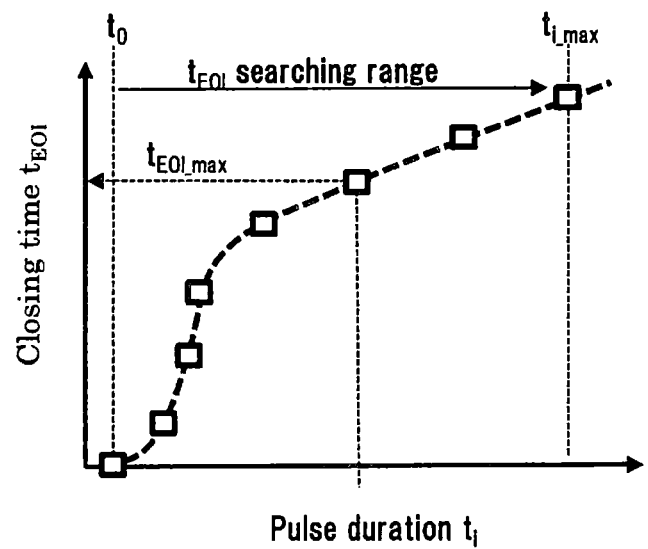
FIG. 8a shows an example of a first correlation between pulse duration and closing time determined for an arbitrary fuel injector.
Figure 8B:
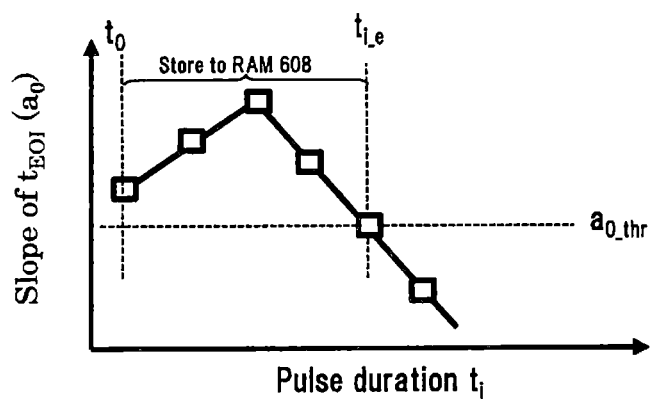
FIG. 8b shows the slopes of the exemplary first correlation depicted in FIG. 8a determined for each pulse duration.
Figure 8C:
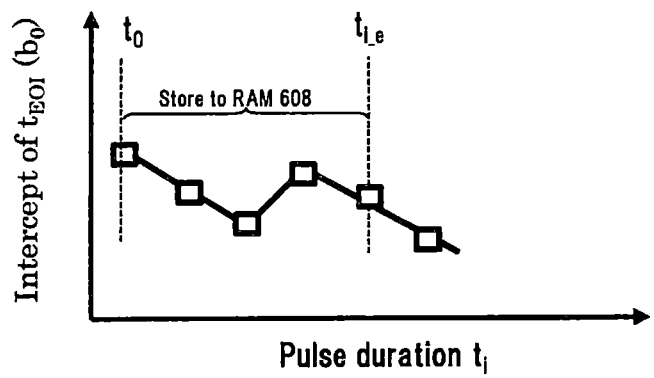
FIG. 8c shows the intercepts of the exemplary first correlation depicted in FIG. 8a determined for each pulse duration.

FIGS. 8a-8c show schematically a preferred example for calculating a slope and an intercept of a first correlation for each pulse duration according to the herein disclosed subject matter. In particular, FIG. 8a shows an example of a first correlation between pulse duration ti and closing time $t_{EOI}$ determined for an arbitrary fuel injector 101. The course of the first correlation is similar to the characteristic curve shown in FIG. 7a since the closing time $t_{EOI}$ and the fuel amount Q are linear dependent on each other (see FIG. 7b). As described above the first correlation is determined during a learning mode of the internal combustion engine by stepwise increasing the pulse duration ti applied to a fuel injector 101 and determining the closing time $t_{EOI}$ for each pulse duration ti. The variation of the pulse duration may start at the delay time $t_0$ of the respective fuel injector 101 and a preliminary maximum pulse duration $t_{i\_max}$ may be set in advance as the last pulse duration at which the closing time $t_{EOI}$ is determined.

The FIGS. 8b and 8c show the slopes $a_0$ and intercepts $b_0$ of the exemplary first correlation depicted in FIG. 8a determined for each pulse duration ti. This means that the slopes $a_0$ depicted in FIG. 8b and the corresponding intercepts $b_0$ depicted in FIG. 8c are determined between two adjacent pulse durations ti of the exemplary first correlation depicted in FIG. 8a.

If a closing time $t_{EOI}$ is determined for a pulse duration $t_{i\_e}$ at which a calculated slope $a_0$ is equal to or smaller than a predetermined slope value $a_{0\_thr}$, said closing time $t_{EOI}$ may be determined as the maximum closing time $t_{EOI\_max}$ of the fuel injector 101 in ballistic operation. Since the first correlation shows a significant decrease in the slope during the transition from ballistic operation to full stroke operation (see FIG. 8a), the end of the ballistic operation range $t_{i\_e}$ can be reliably determined by setting a predetermined slope value $a_{0\_thr}$ as a threshold value. This allows to limit the time required for the learning mode as well as the calculation effort of the control unit 150. For example, the predetermined slope value $a_{0\_thr}$ may be determined in advance on a test bench for all fuel injectors 101 attached to the internal combustion engine and stored in the ROM 607 of the ECU 109. The slopes $a_0$ and intercepts $b_0$ determined for the pulse durations from $t_0$ to $t_{i\_e}$ may be stored into the RAM 608.

Figure 9A:
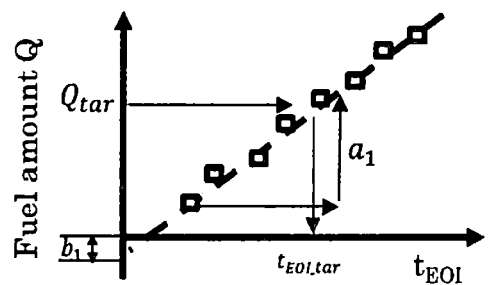
FIG. 9a shows an exemplary second correlation from which a target closing time for a fuel injector can be determined based on a fuel amount to be injected into the internal combustion engine.
Figure 9B:
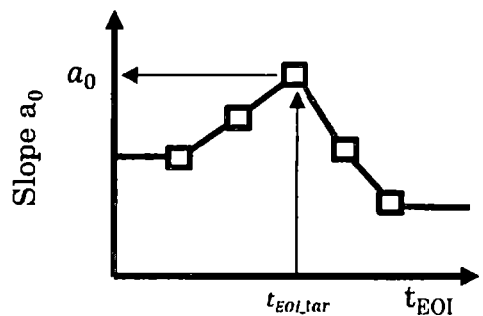
FIG. 9b shows the target closing time $t_{EOI\_tar}$ and the corresponding slope $a_0$.
Figure 9C:
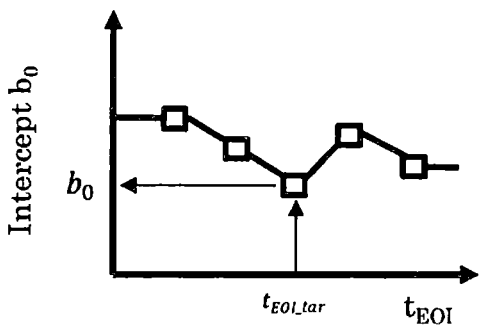
FIG. 9c shows the target closing time $t_{EOI\_tar}$ and the corresponding intercept $b_0$.

FIGS. 9a to 9c show schematically a preferred example for determining a pulse duration of an individual fuel injector based on a target closing time $t_{EOI\_tar}$ and the corresponding slope $a_0$ and intercept $b_0$ according to the herein disclosed subject matter. In particular, FIG. 9a shows an exemplary second correlation from which a target closing time $t_{EOI\_tar}$ for a fuel injector 101 can be determined based on a fuel amount $Q_{tar}$ to be injected into the internal combustion engine. After the target closing time $t_{EOI\_tar}$ has been determined, the associated slope $a_0$ and intercept $b_0$ determined in the learning mode for each fuel injector 101 can be read out from the RAM 608 (see FIGS. 9b and 9c). The required pulse duration $t_{i\_bal}$ of an individual fuel injector 101 in ballistic operation can then be calculated using the following formula:

$$t_{ibal} = \frac{1}{a_0}\left(\frac{Q_{tar}-b_1}{a_1} - b_0\right) \quad (1)$$

wherein according to FIG. 9a the following applies:

$$\frac{Q_{tar}-b_1}{a_1} = t_{EOItar} \quad (2)$$

This means that a pulse duration $t_{i\_bal}$ of an individual fuel injector 101 can be determined based on a general linear relationship between closing time $t_{EOI}$ and injected fuel amount Q (second correlation), which can be adapted to the individual behaviour of a respective fuel injector 101 via a first correlation between pulse duration ti and closing time $t_{EOI}$ for each fuel injector 101. The individual steps of the procedures described in the FIGS. 8a to 8c and 9a to 9c are explained below using the flow charts depicted in the FIGS. 10 and 11.

Figure 10:
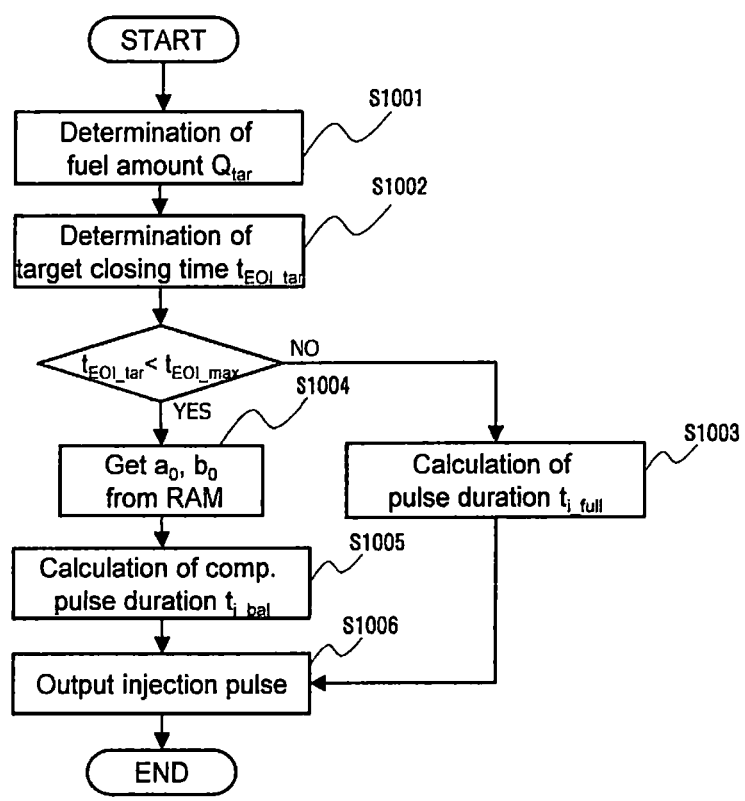
FIG. 10 shows a flow chart that illustrates a preferred example of the method according to the herein disclosed subject matter.

FIG. 10 shows a flow chart that illustrates a preferred example of the method according to the herein disclosed subject matter. In particular, FIG. 10 exemplary shows as to how a required pulse duration $t_{i\_bal}$ or $t_{i\_full}$ of an individual fuel injector 101 may be determined for a required fuel amount $Q_{tar}$. In a first step S1001 after starting the method, the fuel amount $Q_{tar}$ to be injected may be determined according to the operation conditions of the internal combustion engine. In the following step S1002, the target closing time $t_{EOI\_tar}$ may be determined from the second correlation stored in the ROM 607 of the ECU 109 according to formula (2) above (see also FIG. 9a).

If the determined target closing time $t_{EOI\_tar}$ is smaller than the maximum closing time $t_{EOI\_max}$ in ballistic operation, the method may proceed to step S1004 to read out a slope $a_0$ and intercept $b_0$ of the fuel injector correlating to the target closing time $t_{EOI\_tar}$ from the RAM 608. Based on the determined target closing time $t_{EOI\_tar}$ and the slope $a_0$ and intercept $a_0$ read out from the RAM 608, the required pulse duration $t_{i\_bal}$ of the respective fuel injector 101 may be calculated in step S1005 according to formula (1) and the resulting injection pulse may be output to the fuel injector 101 (S1006). After outputting the injection pulse in step S1006, the method may be terminated.

If the determined target closing time $t_{EOI\_tar}$ is larger than the maximum closing time $t_{EOI\_max}$ in ballistic operation, the method may proceed to step S1003 and may determine the pulse duration $t_{i\_full}$ from the characteristic curve of the fuel injector 101 (see FIG. 7a). The resulting injection pulse may then be output to the fuel injector 101 (S1006) before the method may be terminated.

Figure 11:
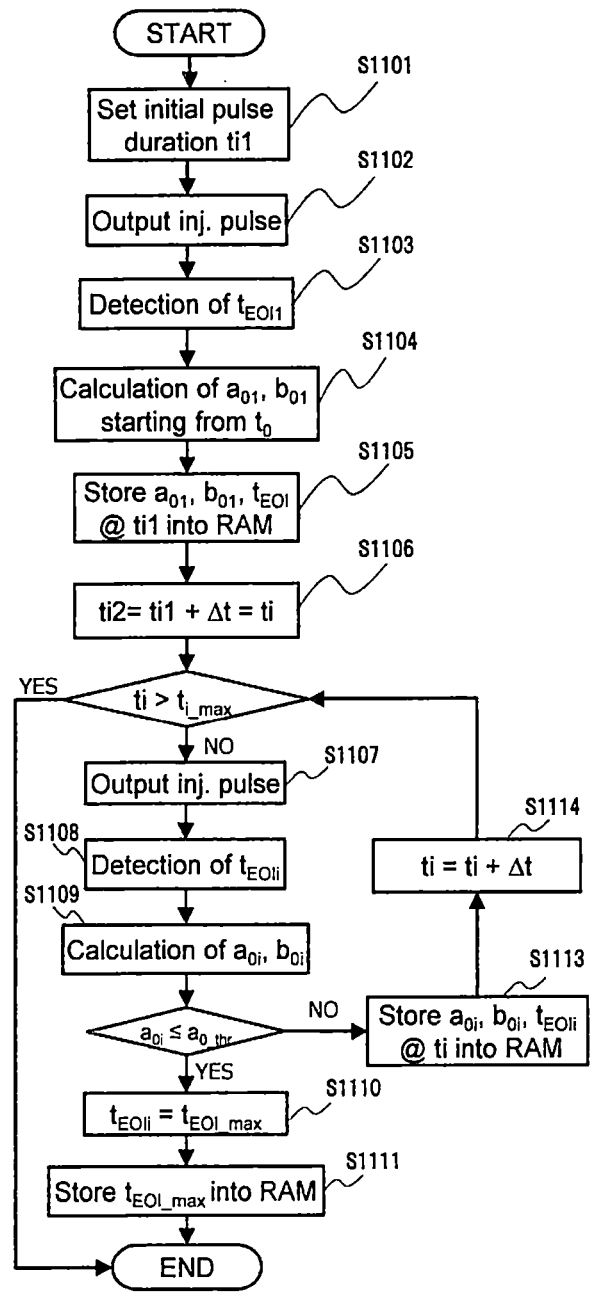
FIG. 11 shows a flow chart that illustrates a further preferred example of the method according to the herein disclosed subject matter.

FIG. 11 shows a flow chart that illustrates a further preferred example of the method according to the herein disclosed subject matter. In particular, FIG. 11 exemplary shows as to how the first correlation and the slopes $a_0$ and intercepts $b_0$ thereof may be determined during the learning mode for an individual injector 101. After starting the method an initial pulse duration ti1 may be set in step S1101 and an injection pulse resulting from the initial pulse duration ti1 may be output to the fuel injector 101 in step S1102. Subsequently, in step S1103 the closing time $t_{EOI1}$ corresponding to the initial pulse duration ti1 may be detected and a slope $a_{01}$ and intercept $b_{01}$ thereof may be calculated using the delay time to at which the closing time is $t_{EOI}=0$ as starting point for the calculation (S1104). In the following step S1105, the determined closing time $t_{EOI1}$ and the calculated slope $a_{0I}$ and intercept $b_{01}$ for the initial pulse duration ti1 may be stored into the RAM 608 of the ECU 109. Then, the initial pulse duration ti1 may be increased by a time period ?t to the second pulse duration ti2 in step S1106. The time period ?t may be in the range of 0.001 ms to 0.4 ms.

If the second pulse duration ti2 or any of the following pulse durations ti is larger than the preliminary maximum pulse duration $t_{i\_max}$, the method is terminated. In case that the second pulse duration ti2 is already larger than the preliminary maximum pulse duration $t_{i\_max}$, only one slope $a_{01}$ and intercept $b_{01}$ may be necessary for calculating a required pulse duration $t_{i\_bal}$ in ballistic operation of the fuel injector 101. However, if the second pulse duration ti2 or any of the following pulse durations ti is smaller than the preliminary maximum pulse duration $t_{i\_max}$, the method may proceed to step S1107 and may output the injection pulse resulting from the pulse duration ti2 (or a following pulse duration ti) to the fuel injector 101. Subsequently, in step S1108 the closing time $t_{EOIi}$ corresponding to the respective pulse duration ti may be detected and a slope $a_{0i}$ and intercept $b_{0i}$ thereof may be calculated (S1109).

In other words, a slope $a_{0i}$ of the closing time $t_{EOI}$ and the corresponding intercept $b_{0i}$ between two subsequent pulse durations ti may be determined in step S1109. As long as the calculated slope $a_{0i}$ is larger than the predetermined slope value $a_{0\_thr}$, the determined closing time $t_{EOIi}$ and the calculated slope $a_{0i}$ and intercept $b_{0i}$ for each pulse duration ti may be stored into the RAM 608 of the ECU 109 in step S1113. Then, the pulse duration ti may be increased again by a time period ?t in step S1114. If the calculated slope $a_0$ is equal to or smaller than the predetermined slope value $a_{0\_thr}$, the determined closing time $t_{EOIi}$ may be set as the maximum closing time $t_{EOI\_max}$ and stored into the RAM 608 (steps S1110 and S1111). Subsequently, the method may be terminated for the respective fuel injector 101 since all relevant parameters necessary for calculating a required pulse duration $t_{i\_bal}$ in ballistic operation are now available in the RAM 608.

Figure 12:
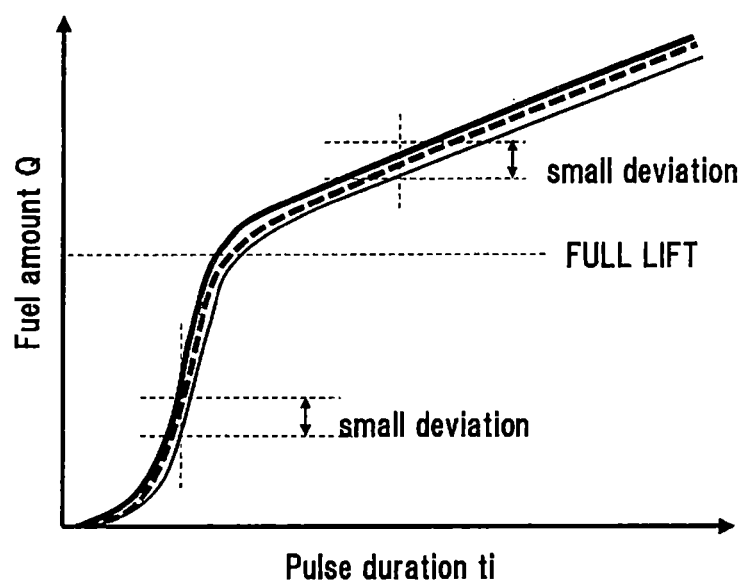
FIG. 12 shows schematically a relation between pulse duration and injection quantity of a fuel injector controlled according to the herein disclosed subject matter.

FIG. 12 shows schematically a relation between pulse duration ti and injection quantity Q of different fuel injectors 101 controlled according to the herein disclosed subject matter. When comparing the characteristic curves of the different fuel injectors 101 depicted in FIG. 12 with the characteristic curves depicted in FIG. 7a, it becomes obvious that by calculating a required pulse duration $t_{i\_bal}$ in ballistic operation as described above, the deviation of the fuel amount can be strongly reduced. In particular, the herein disclosed subject matter enables to reduce the deviation of the fuel amount between different injectors/different injections in ballistic operation to the level of full lift operation. This can be achieved by calculating a pulse duration $t_{i\_bal}$ of an individual fuel injector 101 based on a general linear relationship between closing time $t_{EOI}$ and injected fuel amount Q (second correlation), which can be adapted to the individual behaviour of a respective fuel injector 101 via a first correlation between pulse duration ti and closing time $t_{EOI}$ for each fuel injector 101. The described calculation requires very little calibration effort and ensures a continuous adjustment of the calculated pulse duration during the operating time of the engine so that ageing effects of the fuel injectors 101 and environmental conditions that influence the opening/closing behaviour of the fuel injectors 101 can be permanently considered.

REFERENCE SIGNS LIST

101 fuel injector
150 control device
602 injector closing time calculation unit
603 control parameter calculation unit
604 injection pulse calculation unit
605 injection pulse compensation unit
606 injection pulse learning unit
607 read-only memory (ROM)
608 random-access memory (RAM)

The invention claimed is:

1. A control device for controlling a fuel injector attached to an internal combustion engine, the control device comprising a control parameter calculation unit, an injection pulse calculation unit, an injection pulse compensation unit and at least one memory, wherein
the control parameter calculation unit is configured to determine a target closing time for the fuel injector based on a fuel amount to be injected into the internal combustion engine,
if the determined target closing time is larger than a maximum closing time of the fuel injector in ballistic operation,
the injection pulse calculation unit is configured to calculate a pulse duration for the injector based on a characteristic curve of the fuel injector, and to output the calculated pulse duration to the fuel injector for injecting the fuel amount into the internal combustion engine, and
if the determined target closing time is equal to or smaller than the maximum closing time during the ballistic operation, the injection pulse compensation unit is configured to receive a set of parameters correlating to the determined target closing time from the at least one memory, to calculate a pulse duration for the fuel injector based on the received set of parameters; and to output the calculated pulse duration to the fuel injector for injecting the fuel amount into the internal combustion engine.

2. The control device according to claim 1, wherein the set of parameters include a slope and an intercept of a first correlation between the pulse width duration and a measured closing time of the fuel injector taken during a learning mode, the set of parameters being stored in the at least one memory.

3. The control device according to claim 2, wherein the control parameter calculation unit is configured to determine the target closing time for the fuel injector based on a second correlation between the measured closing time of the fuel injector and the fuel amount to be injected by a plurality of fuel injectors.

4. The control device according to claim 1, further comprising an injector closing time calculation unit and an injection pulse learning unit, wherein in a learning mode of the internal combustion engine,
the injection pulse learning unit is configured to increase the pulse duration of the fuel injector stepwise,
the injector closing time calculation unit is configured to determine a closing time for each pulse duration, and to send the determined closing time to the injection pulse learning unit, and
the injection pulse learning unit is configured to receive the determined closing time for each pulse duration from the injector closing time calculation unit, and to determine the first correlation between pulse duration and closing time of the fuel injector.

5. The control device according to claim 2, further comprising: an injection pulse learning unit, wherein the injection pulse learning unit is configured to calculate a slope and an intercept of the first correlation between pulse duration and closing time of the fuel injector for each pulse duration, and to store the calculated slope and intercept in the at least one memory.

6. The control device according to claim 5, wherein the injection pulse learning unit is configured to determine a closing time at which a calculated slope is equal to or smaller than a predetermined slope value as the maximum closing time of the fuel injector in ballistic operation, and to store the determined maximum closing time in the at least one memory.

7. The control device according to claim 6, wherein the injection pulse learning unit is configured to stop the learning mode of the internal combustion engine when the maximum closing time of the fuel injector in ballistic operation is determined.

8. The control device according to claim 4, wherein the injection pulse learning unit is configured to start the learning mode when the internal combustion engine is operated in a predetermined operation mode.

9. The control device according to claim 4, wherein the injector closing time calculation unit is configured to determine the closing time of the fuel injector based on a drive current curve of the fuel injector.

10. An internal combustion engine including at least one fuel injector and the control device according to claim 1.

11. A method for controlling a fuel injector attached to an internal combustion engine by a control device, the control device comprising a control parameter calculation unit, an injection pulse calculation unit, an injection pulse compensation unit and at least one memory, the method comprising the steps
- determining, by the control parameter calculation unit, a target closing time for the fuel injector based on a fuel amount to be injected into the internal combustion engine;
- if the determined target closing time is larger than a maximum closing time of the fuel injector in ballistic operation;
- calculating, by the injection pulse calculation unit, a pulse duration for the fuel injector based on a characteristic curve of the fuel injector;
- outputting, by the injection pulse calculation unit, the calculated pulse duration to the fuel injector for injecting the fuel amount into the internal combustion engine;
- if the determined target closing time is equal to or smaller than the maximum closing time of the fuel injector in the ballistic operation;
- receiving, by the injection pulse compensation unit, a set of parameters correlating to the determined target closing time from the at least one memory;
- calculating, by the injection pulse compensation unit, a pulse duration for the fuel injector based on the received set of parameters;
- outputting, by the injection pulse compensation unit, the calculated pulse duration to the fuel injector for injecting the fuel amount into the internal combustion engine.

12. The method according to claim 11, wherein the set of parameters include a slope and an intercept of a first correlation between the pulse width duration and a measured closing time of the fuel injector, taken during a learning mode, from the at least one memory, the set of parameters being stored in the at least one memory.

13. The method according to claim 12, wherein the target closing time for the fuel injector is determined by the control parameter calculation unit based on a second correlation between the measured closing time of the fuel injector and the fuel amount to be injected by a plurality of fuel injectors.

14. The method according to claim 11, wherein the control unit further comprises an injector closing time calculation unit and an injection pulse learning unit, and in a learning mode of the internal combustion engine,
- the pulse duration of the fuel injector is stepwise increased by the injection pulse learning unit,
- a closing time for each pulse duration is determined and sent to the injection pulse learning unit by the injector closing time calculation unit, and
- the determined closing time for each pulse duration is received and the first correlation between pulse duration and closing time of the fuel injector is determined by the injection pulse learning unit.

15. The method according to claim 12, wherein a slope and an intercept of the determined first correlation between pulse duration and closing time of the fuel injector are calculated by an injection pulse learning unit for each pulse duration and stored in the at least one memory.

16. The method according to claim 15, wherein a closing time at which a calculated slope is equal to or smaller than a predetermined slope value is determined by the injection pulse learning unit as the maximum closing time of the fuel injector in ballistic operation and is stored in the at least one memory.

17. The method according to claim 16, wherein the learning mode of the internal combustion engine is stopped by the injection pulse learning unit when the maximum closing time of the fuel injector in ballistic operation is determined.

18. The method according to claim 14, wherein the learning mode is started by the injection pulse learning unit when the internal combustion engine is operated in a predetermined operation mode.

19. The method according to claim 11, wherein the closing time measured by an injector closing time calculation unit is determined based on a drive current curve of the fuel injector.

20. A computer program product storable in a memory comprising instructions which, when carried out by a computer, cause the computer to perform the method according to claim 11.

21. A method for adapting a pulse duration of a fuel injector attached to an internal combustion engine by an injection pulse learning unit in a learning mode of the internal combustion engine, the method comprising the steps:
- stepwise increasing a pulse duration of the fuel injector;
- detecting a closing time for each pulse duration;
- calculating a slope and an intercept between the pulse duration and the closing time of the fuel injector for each pulse duration;
- determining a closing time at which the calculated slope is equal to or smaller than a predetermined slope value and/or a closing time at which the calculated slope has a negative slope value as a maximum closing time of the fuel injector in ballistic operation;
- stopping the learning mode after determining the maximum closing time of the fuel injector in ballistic operation; and
- storing the calculated slopes and intercepts and the maximum closing time of the fuel injector in ballistic operation as a set of parameters in at least one memory.

22. The method according to claim 21, wherein the learning mode is started by the injection pulse learning unit when the internal combustion engine is operated in a predetermined operation mode.

23. The method according to claim 21, wherein the closing time of the fuel injector is determined based on a drive current curve of the fuel injector.

24. A computer program product storable in a memory comprising instructions which, when carried out by a computer, cause the computer to perform the method according to claim 21.

25. An injection pulse learning unit for a control device configured to perform the method according to claim 21.

* * * * *